US008036983B2

(12) United States Patent
Macklin et al.

(10) Patent No.: US 8,036,983 B2
(45) Date of Patent: Oct. 11, 2011

(54) SYSTEM FOR AND METHOD OF WEB BASED NON-WAGE COMPENSATION

(75) Inventors: Lee Macklin, Colorado Springs, CO (US); Kay Burrows, Colorado Springs, CO (US); Daryl Schroeder, Florissant, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3916 days.

(21) Appl. No.: 10/052,608

(22) Filed: Jan. 18, 2002

(65) Prior Publication Data
US 2003/0140001 A1 Jul. 24, 2003

(51) Int. Cl.
*G06Q 40/00* (2006.01)
(52) U.S. Cl. ......................................................... 705/39

(58) Field of Classification Search .................... 705/34, 705/64
See application file for complete search history.

(56) References Cited

U.S. PATENT DOCUMENTS

| | | | | |
|---|---|---|---|---|
| 5,893,080 A | * | 4/1999 | McGurl et al. | 705/40 |
| 6,032,133 A | * | 2/2000 | Hilt et al. | 705/40 |
| 6,401,079 B1 | * | 6/2002 | Kahn et al. | 705/30 |

* cited by examiner

*Primary Examiner* — Lindsay M. Maguire

(57) ABSTRACT

The present invention is directed to a system for and a method of a disbursement system which includes an input module configured to receive a disbursement request and an authorization module configured to apply predetermined rules to the disbursement request. Also included in the present invention is an accounting module configured to track available funds from which particular disbursements are to be made and an output module configured to process approved disbursement requests.

3 Claims, 3 Drawing Sheets

SYSTEM FOR AND METHOD OF WEB BASED NON-WAGE COMPENSATION

TECHNICAL FIELD

The present invention generally relates to a web based non-wage compensation program and more specifically to a program which runs in a specific location on the world wide web and can be accessed by individual sites for submission, verification, validation and approval of non-wage compensation requests.

BACKGROUND OF THE INVENTION

In addition to conventional wages, employers may compensate their employees using a variety of methods. Additional compensation and payments to employees may consist of bonuses, awards, reimbursements for incurred expenses, gifts, conference fees, convention fees, prepayment of expenses, or similar items. These additional forms of compensation and payments will be referred to herein as non-wage compensation or additional compensation. Typically, submission, processing and approval of these non-wage compensation requests are handled outside of the normal payroll process. These non-wage compensation requests are typically submitted, verified, validated, approved or disapproved through a process defined by the employer. Many employers use paper forms to request and track these non-wage compensation payments. For instance, a manager initiating an award of a bonus may complete and submit a bonus request form for approval. The completed bonus request form passes through an approval cycle and, when approved, may be sent to payroll for payment. Alternatively, an individual seeking reimbursement for a company related expense may complete and submit an expense reimbursement request which is processed through an approval cycle before payment is authorized. Once payment is authorized in connection with the reimbursement request, the form may be sent to the payroll department for payment. Each of these methods is time consuming, prone to error, and inefficient.

Employers may also allocate specific funds to be used for bonuses, awards, reimbursements, gifts, convention and conference fees, publication awards, or other types of non-wage compensation to their employees. If an employer has allocated funding in this manner, amounts approved for non-wage compensation to employees must be deducted from the allocated amounts in each category. The availability of these funds may also be queried prior to approving such a request. Typically a payroll department oversees these allocated funds.

The problems associated with paying and tracking non-wage compensation to employees is exasperated for multi-site employers. Multi-site employers may allocate financial resources to these expenses to the aforementioned categories or by site. Additionally, maintaining standard request, validation, and approval procedures across sites may be difficult for multi-site employers.

Accordingly, a need exists for a method of and system for processing and paying non-wage compensation requests and payments.

SUMMARY OF THE INVENTION

The present invention is directed to a system and method for disbursing non-wage compensation including an input module, an authorization module, an accounting module and an output module. The input module may include an interface configured to receive disbursement requests from a requestor. The authorization module is configured to apply predetermined rules which, for example, verify the authorization of the requesting party to request or approve such a request. An accounting module is configured to track available funds from which particular disbursements are to be drawn. The output module is configured to process approved disbursement payments.

DETAILED DESCRIPTION

A need exists for a system for and a method of submitting, verifying, validating, approving, and processing non-wage compensation payments. For multi-site employers, this non-wage compensation system may advantageously be web based to provide convenient access for each of the employer's sites. Non-wage compensation requests may include identifying information concerning the requestor, identifying information concerning the recipient, the reason for the non-wage compensation, the amount of the non-wage compensation, reasons justifying the non-wage compensation, an approval process for the request, a category of finds payment of the request is withdrawn from, and any other information considered pertinent to the non-wage compensation request or payment. Predetermined rules for reviewing, checking, validating and verifying the information contained in the non-wage compensation request are then applied to determine the validity of the request. Business rules may include ensuring (1) the requestor and the recipient are not the same individual, (2) the requestor has the authority to request the compensation, (3) the requested compensation does not exceed the requestor's approved request amount, (4) the requestor and the recipient are not related, or (5) similar safeguards.

Figure 1:
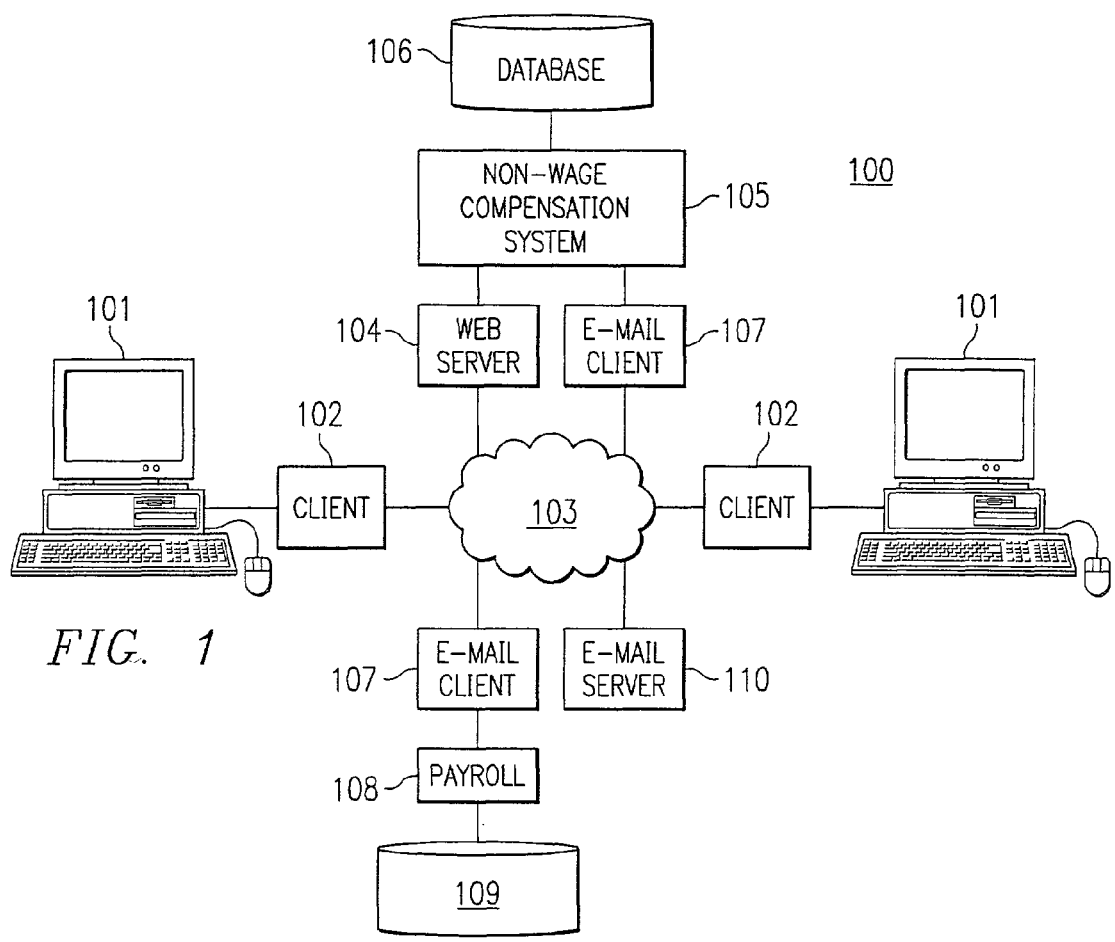
FIG. 1 is a block diagram of one embodiment of the present invention configured for use by a multi-site employer.

FIG. 1 depicts one embodiment 100 of the present invention for a multi-site employer. Computer systems 101 are configured to communicate via access provider or client 102 with an internet or an intranet 103. Preferably, the present invention is hosted on the private intranet of a company for security purposes. Alternatively, conventional security systems and protocols may be implemented to ensure system integrity. Non-wage compensation system 105 is configured to receive and transmit information via web server 104 to the internet or intranet 103 and store and access information in database 106. A requestor may access non-wage compensation system 105 through a computer system 101. Computer system 101 may communicate via access provider or client 102, intranet 103, web server 104 with non-wage compensation system 105 to determine the appropriate screens to display to the user at system 101. Screens displayed may include a series of questions that are answered by the requestor, a form that is filled out by the requestor, or a graphics user interface (GUI) which is used to elicit the required information from the requestor. One of ordinary skill in the art would understand that numerous screens or numerous configurations of screens may be displayed at computer 101 and interact with the requestor to elicit the desired information.

Once the information is received, the information is sent via client 102, internet 103, and web server 104 to non-wage compensation system 105. Non-wage compensation system 105 may use a web application daemon, configured to receive disbursement requests. Non-wage compensation system 105 is configured to apply various predetermined rules to the received compensation request. These rules may reside in database 106, within non-wage compensation system 105, or in a combination of distinct databases, either local to, or remote from, system 105. Such rules may include a requirement to verify that the requested amount is available for disbursement, that the requestor is authorized to initiate non-wage compensation, that the requestor and the recipient are not the same individual. The system may also identify required approvals for the request, determine whether the recipient has already received compensation related to the pending request, or run other predetermined rules.

Non-wage compensation 105 may, at this point, initiate a query for additional information from the requestor through web server 104, intranet 103, client 102 and computer system 101. Once non-wage compensation system 105 verifies the information contained in the compensation request, the request may be forwarded to a second individual for approval. If the request is forwarded to a second individual for approval, non-wage compensation system 105 may forward the request via web server 104, intranet 103, client 102 to a computer system 101 for review, comments, and/or approval from the second individual. The request may be further routed to other required or alternate approval mechanisms, authorities and/or personnel as necessary and defined by a predetermined authorization policy, rules, and/or procedures. The approval procedure may include individual routing instructions instead of or supplementing prestored rules and procedures. Preferably each approving authority signs the request using, for example, a digital signature.

Alternatively, the approval authorities may communicate directly with the system at the time of payment to authorize payment at such time so that all necessary approvals are verified as still applicable and effective immediately prior to actual payment. In such case, the approval may be processed at the time of receipt for automatic verification at the time of payment subject to cancellation or modification in the intervening period.

Once the compensation request has received the necessary approvals, non-wage compensation system 105 may send the approved request via web server 104, internet 103, interface/web server 107 to payroll 108. Payroll 108 then processes the approved compensation request. Payroll 108 may interface with database 109 to determine the availability of funds, or to deduct the funds required to pay the approved request from the appropriate account. In a preferred embodiment, non-wage compensation system 105 provides feedback to the additional compensation requestor indicating that the compensation request has been received and will be processed by the system. Non-wage compensation system 105 may also include the ability for the requestor and/or recipient to determine the status of the pending compensation request. Non-wage compensation system 105 may store status information in database 106 for ready access when such status query is received from the requestor or the recipient of the compensation request. Alternatively, non-wage compensation system 105 may broadcast status instructions to entities involved in the approval process for pending requests, requesting the status of the pending request when a status request is made. Non-wage compensation system 105 may also be configured to send an e-mail message through e-mail client 107 to internet 103 and e-mail server 110 to payroll 108 to process payment of the non-wage compensation request.

Figure 2:
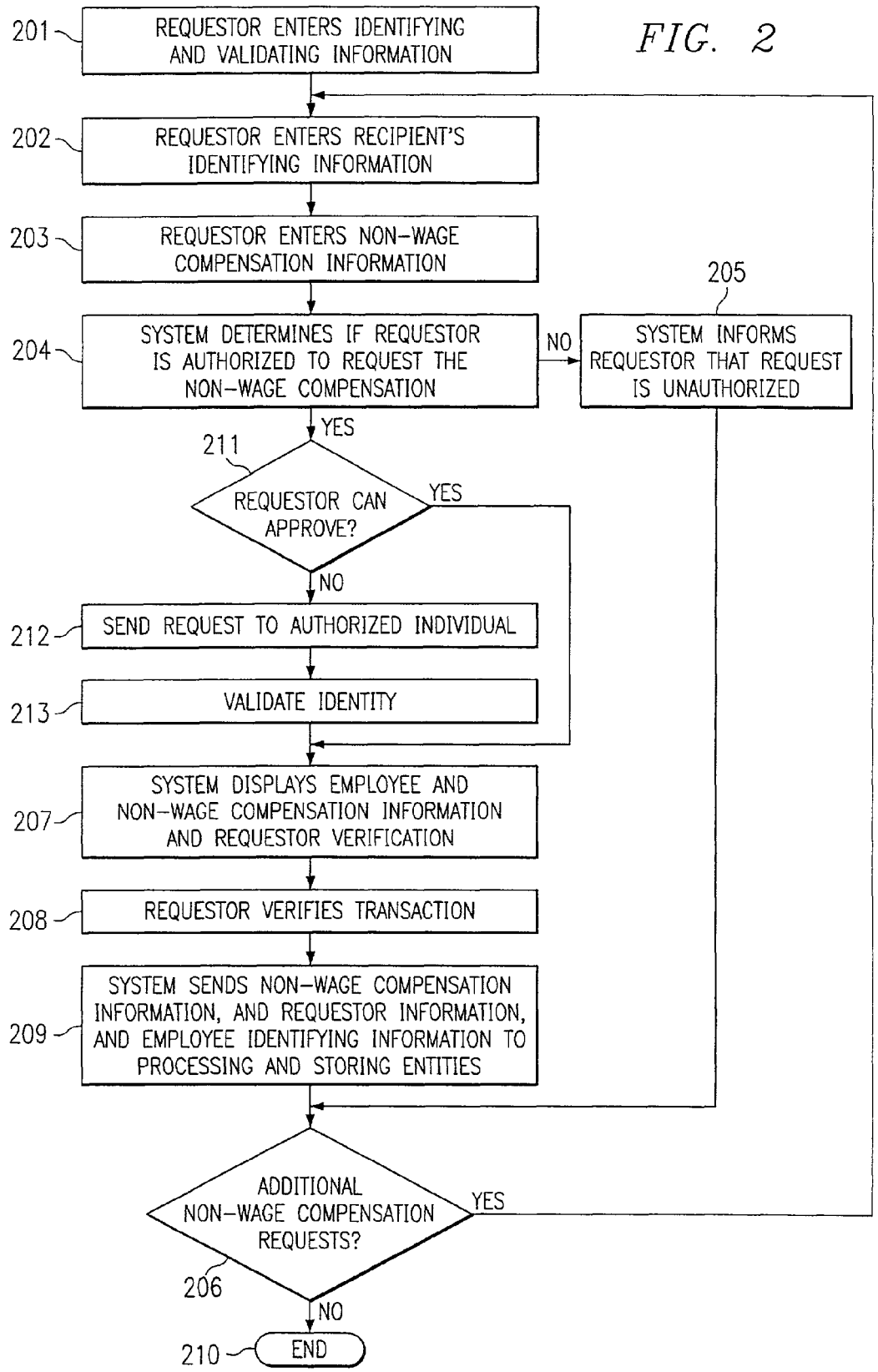
FIG. 2 is a flow chart depicting the request, processing, and approval process of the present invention.

FIG. 2 is a flow chart depicting a process the requestor follows to request additional compensation for an employee or other entity and the process performed by non-wage compensation system 105. In step 201, the requestor enters identifying and validating information concerning their identity. This information may include employee number, a personal identification number (PIN), a password, or other information used to specifically identify the requestor and to verify the requestor's identity. In step 202 the requestor enters identifying information concerning the proposed recipient of the non-wage compensation. This information may include the employee's serial number, name, address, social security number, or any other information which is acceptable to uniquely identify the proposed recipient. This information can also be displayed to the requestor through a series of queries initiated by the requestor. For example, if the requestor wishes to give an award to each member of a winning proposal team, non-wage compensation system 105 may supply the names of the proposal team to the requestor in response to queries posed by the requestor.

Once the requestor has uniquely identified the intended recipient or recipient(s) the requestor enters the non-wage compensation information in step 203. The information may include the type of non-wage compensation requested, the amount of non-wage compensation requested, the reason for the request, information justifying the request, time frames associated with the action that justifies the request, the identification of supporting documentation justifying the request, the identity of other individuals who may support the request, the identification of individuals who may be required to approve the non-wage compensation request, or any other information related to the compensation request.

In step 204, the non-wage compensation system determines if the requestor is authorized to request and/or approve the non-wage compensation request. Non-wage compensation system 105 may apply pre-determined rules in step 204. These pre-determined rules may be stored in database 106 of FIG. 1 and accessed by non-wage compensation system 105 as required. These rules may include the determination that the requestor and the recipient are not one in the same individual, that the recipient is not related to the requestor, a determination concerning whether the requestor is authorized to request compensation of any sort, a determination that the requestor is authorized to request compensation in the specified amount, a determination that funds exist to pay the compensation request, a determination as to whether any extenuating circumstances should be considered or any other factors which should be considered in determining whether the compensation request should be approved or disapproved. If it is determined that the requestor is not authorized to request non-wage compensation, step 205 would ensure that non-wage compensation 105 informs the requestor that the request is unauthorized and therefore disapproved. After the requestor is notified in step 205, non-wage compensation system 105 requests whether the requestor has any additional non-wage compensation requests to enter. Step 205 may be bypassed if the requestor lacked the authority to submit any additional compensation requests. If the requestor is not authorized a message may be generated to inform appropriate personnel (e.g., human resources, employee supervisor, security, etc.) that an unauthorized attempt to initiate payment was detected.

Returning to step 204, if the system determines that the requestor is authorized to request non-wage compensation, process proceeds to step 211. A determination is made at step 211 as to whether the requestor is authorized to independently authorize and approve the non-wage compensation request. For example, a particular type of requestor may not need independent authorization for compensation requests under a specific amount. For instance, awards of less than $50.00 may be requested and approved by an individual's first line manager. If, at step 211, a determination is made that the requestor does have the authority to independently approve the compensation request, step 207 causes non-wage compensation system 105 to display the employee and non-wage compensation information and requests verification from the requestor. Once this verification is received at step 208, the non-wage compensation system 105 transmits the non-wage compensation information, requestor information, and employee identifying information to a payment subsystem to be processed and acted upon. Thus, approved requests may be sent from step 209 to a payroll department for processing and storage. Alternatively, non-wage compensation system 105 may include the ability to generate and transmit payment via check or electronic funds.

Returning to step 211, if the requestor does not have the authority to approve the request, processing continues at step 212 and a request is sent to an individual who is authorized to approve the pending request. Once the authorized individual receives the pending request, their identity is validated in step 213 and the system displays the employee and non-wage compensation information and request verification from the authorized person in step 207.

Figure 3:
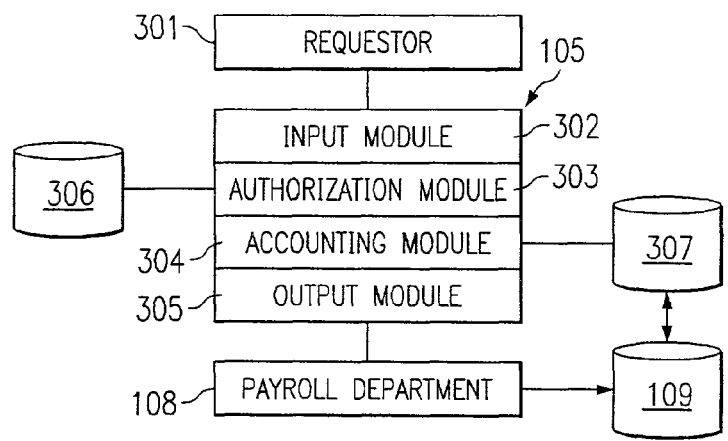
FIG. 3 is a block diagram of one embodiment of the present invention.

FIG. 3 is a block diagram of an embodiment of the present invention. As previously described, requestor 301 interacts with non-wage compensation system 105 to begin the compensation request using input module 302 of non-wage compensation system 105. As previously described, the input module may generate payments for information to which the requestor 301 responds; display a screen for requestor 301 to fill out, or may display a GUI screen to the requestor to submit the required information using, for example, pull down menus specific to the requestor. The menus and/or other options may be tailored to the requestor so as to display and enable only authorized functions and to invoke any additional processing (e.g., authorization requests) required in connection with the request.

Once the compensation request information is received, authorization module 303 applies one or more predetermined rules to determine whether the pending request can be approved. Authorizing module 303 may interact with database 306 in identifying, applying or determining the predetermined rules to be applied. Once authorization module 303 determines that the request is valid, accounting module 304 may determine whether sufficient funds are available to honor the compensation request. Accounting module 304 may interface with database 307 to determine funds available in the specific account, and may update the balance of the specific account once the compensation request has been paid. Once the accounting module has determined the funds are available to honor the compensation request, output module 305 coordinates with, for instance, payroll department 108 and its support systems to ensure payment of the compensation request. One of ordinary skill in the art would appreciate that output module 305 may be expanded to include generation of checks, electronic distribution of funds, or other methods of distributing funds in satisfaction of the pending compensation request. If output module 305 generates payment, it further coordinates with accounting module 304 to ensure the funds are deducted from the appropriate account in database 307. Alternatively, if payroll department 108 generates the check for electronic distribution, payroll department 108 may be used to debit the appropriate account in database 109. Information contained in database 109 and database 307 may also be contained in a single database.

Figure 4:
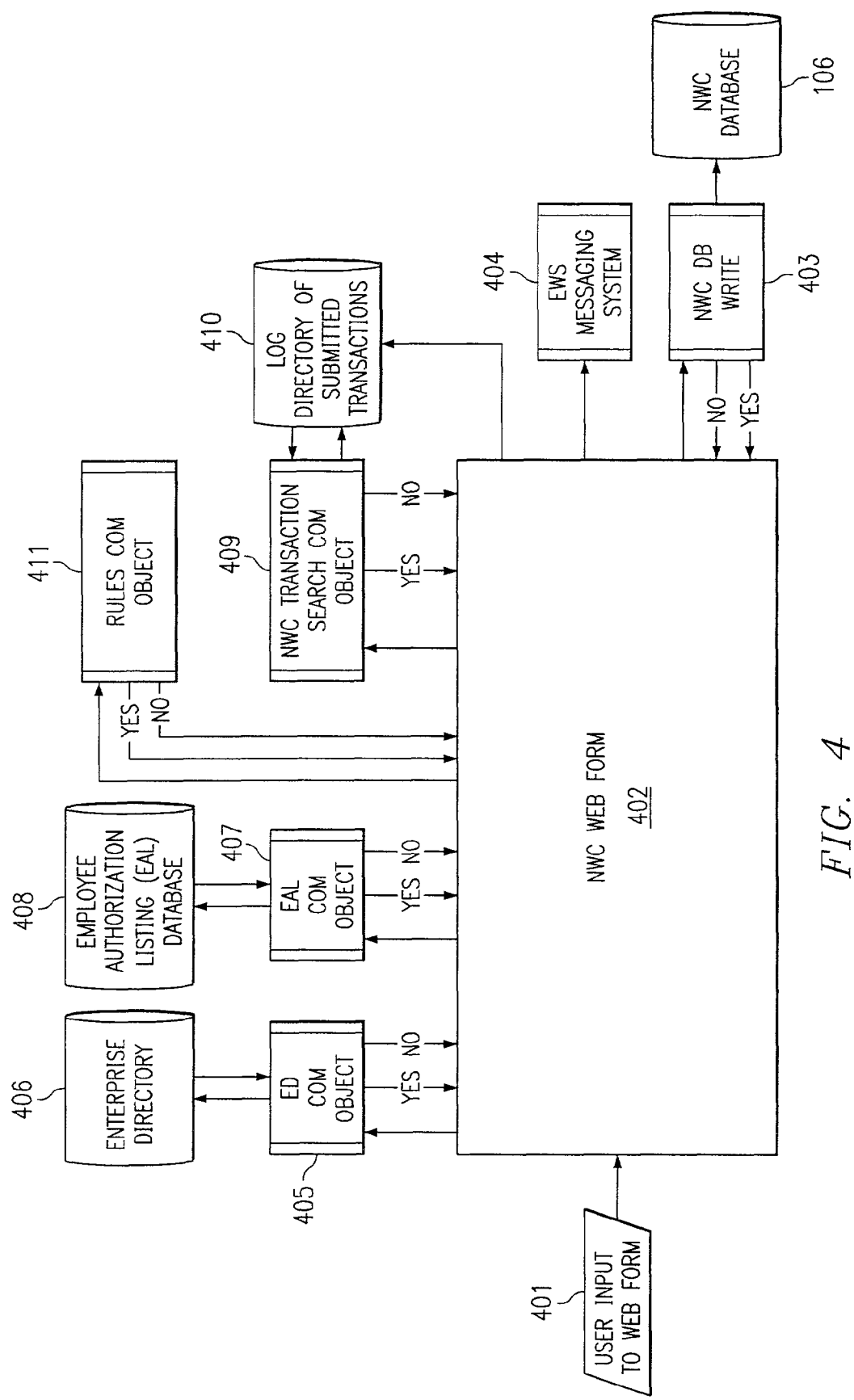
FIG. 4 is a block diagram of a second embodiment of the present invention.

FIG. 4 is a block diagram of a second embodiment of the present invention. The requestor provides user input 401 to a non-wage compensation web form 402. The non-wage compensation web form 402 may, as previously described, include a series of questions designed to solicit information from the requestor, a form to be filled out by the requestor, or a GUI in which the requestor can input the desired information. Once the desired information is included in the non-wage web compensation web form 402, the non-wage compensation database write module 403 may record the information in a non-wage compensation database 106. If additional information is required the non-wage compensation web form 402 may interface with the EWS messaging system 404 to request additional information from the requestor. As previously discussed, the requestor may be prompted to provide identifying information pertaining to the recipient and their user input 401 to the non-wage compensation system. User information may include a social security number or employee number. If an employee number is included, enterprise directory command object 405 may be used to access the enterprise directory 406 which may be searched to identify and load information associated with the employee number into NWC web form 402. Employee authorized listing (EAL) command object 407 may be configured to ensure that the only authorized requesters submit compensation requests. These authorized requesters may be identified in an employee authorized listing database 408. In order to determine whether the requesting individual is an authorized requestor, object 407 interfaces with EAL database 408 to verify authority.

RULES COM object 411 may contain the rules which are applied to a compensation request. One of ordinary skill in the art would appreciate that verification of the requestor's authority to submit the compensation request could also be included in RULES COM object 411. Rules may also be included to ensure complete information regarding the non-wage compensation requested is included. Finally, NWC TRANSACTION SEARCH COM object 409 is used to record a copy of the compensation request made and approved into log directory of submitted transactions 410.

What is claimed is:

1. A network based method of disbursing funds, said network based method including the steps of:
receiving a disbursement request;
applying predetermined rules to authorize said disbursement request;
supervising the proper approval based on applied ones of said authorization rules;
tracking available funds from which said disbursement is to be drawn; and
processing said disbursement for payment, wherein one of said predetermined rules denies authorization of said request when a requesting party is identical to a receiving party.

2. A network based payment processing system comprising:
an input process configured to receive disbursement requests,
an authorization process configured to apply predetermined rules to control verifying proper authorization of said disbursement requests,
an accounting process configured to track parameters pertaining to the fulfillment of authorized ones of said disbursement requests, and an output process configured to process said disbursement requests for payment, wherein one of said predetermined rules denies authorization of said disbursement requests when a requesting party is identical to a receiving party.

3. A payment system comprising:

a web server configured to host a payment processing site for receiving payment requests;

an authorization module configured to apply predetermined rules to control proper authorization of said payment requests to provide approved payments;

an accounting module configured to verify fund availability and to track fund disbursement in connection with said approved payments; and a payment module configured to initiate payment to recipients designated in connection with said approved payments in response to said verification of fund availability and said proper authorization, wherein one of said predetermined rules denies authorization of said payment requests when a requesting party is identical to a receiving party.

* * * * *